United States Patent
Kobylinski et al.

(10) Patent No.: US 7,428,734 B2
(45) Date of Patent: Sep. 23, 2008

(54) METHOD FOR PRESENTING EVENT FLOWS USING SEQUENCE DIAGRAMS

(75) Inventors: Kris Kobylinski, Toronto (CA); Harm Sluiman, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 10/765,776

(22) Filed: Jan. 27, 2004

(65) Prior Publication Data

US 2005/0138641 A1 Jun. 23, 2005

(30) Foreign Application Priority Data

Dec. 17, 2003 (CA) ................................ 2453728

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/318; 715/136; 714/139

(58) Field of Classification Search .............. 719/318; 715/736; 714/39
See application file for complete search history.

(56) References Cited

U.S. PATENT DOCUMENTS

| 5,321,838 | A | * | 6/1994 | Hensley et al. | 717/125 |
| 6,038,538 | A | * | 3/2000 | Agrawal et al. | 705/7 |
| 6,057,839 | A | * | 5/2000 | Advani et al. | 715/784 |
| 6,223,143 | B1 | * | 4/2001 | Weinstock et al. | 703/17 |
| 6,268,852 | B1 | * | 7/2001 | Lindhorst et al. | 715/744 |
| 6,671,830 | B2 | * | 12/2003 | Kaler et al. | 714/39 |
| 6,766,508 | B1 | * | 7/2004 | Isham | 717/116 |
| 6,968,292 | B2 | * | 11/2005 | Boyer | 702/182 |
| 7,155,514 | B1 | * | 12/2006 | Milford | 709/225 |
| 7,213,230 | B2 | * | 5/2007 | Harel et al. | 717/113 |
| 7,249,356 | B1 | * | 7/2007 | Wilson et al. | 718/101 |
| 7,272,820 | B2 | * | 9/2007 | Klianev | 717/109 |
| 7,275,250 | B1 | * | 9/2007 | Novik et al. | 719/318 |
| 7,308,689 | B2 | * | 12/2007 | Black et al. | 719/318 |

(Continued)

FOREIGN PATENT DOCUMENTS

JP 200105653 4/2000

OTHER PUBLICATIONS

Karam, G. M., Visualization using timelines, 1994, ACM Press, Proceedings of the 1994 ACM SIGSOFT International Symposium on Software Testing and Analysis, T. Ostrand, Ed. ISSTA '94, pp. 125-137.*

(Continued)

*Primary Examiner*—Thomas Lee
*Assistant Examiner*—KimbleAnn Verdi
(74) *Attorney, Agent, or Firm*—Duke W. Yee; Herman Rodriguez; Houda El-Jarrah

(57) ABSTRACT

A method and system for presenting event associations between events from one or more event flows on a display screen of a computer, the method comprising: constructing a sequence diagram representation, the representation having timelines for the event flows and directional paths between the timelines for the event associations; and, displaying the representation on the display.

7 Claims, 8 Drawing Sheets

U.S. PATENT DOCUMENTS

2003/0145125 A1* 7/2003 Horikawa ............... 709/318
2003/0149800 A1* 8/2003 Bouchet ............... 709/318
2003/0163275 A1* 8/2003 Farrell et al. ............... 702/127
2004/0230953 A1* 11/2004 Garzia et al. ............... 717/124
2004/0243944 A1* 12/2004 Sabiers et al. ............... 715/853
2005/0055662 A1* 3/2005 Strausbaugh et al. ............... 717/100

OTHER PUBLICATIONS

Bernardi, S., Donatelli, S., and Merseguer, J., "From UML sequence diagrams and statecharts to analysable petri net models", Jul. 24-26, 2002, ACM Press, Proceedings of the 3rd international Workshop on Software and Performance, WOSP '02, pp. 35-45.*

* cited by examiner

METHOD FOR PRESENTING EVENT FLOWS USING SEQUENCE DIAGRAMS

FIELD OF THE INVENTION

This invention relates to the field of computer system analysis tools, and more specifically, to analysis tools for event flows or logs from computer programs or systems.

BACKGROUND

Many computer systems and programs automatically create a record of the sequence or flow of events that are carried out with respect to their operations, internal state, and external messaging. These events may be time-stamped. The recorded sequence of events is commonly referred to as a processing, activity, event, or error log. Typically, the log is used for subsequent analysis and trouble-shooting. The trouble-shooting could involve noting operation or communication errors and taking appropriate action.

For example, a file server system, which might service a plurality of users that request access to copies of data files, typically records event flows in a log. Responding to the requests for copies is seen by the system as a sequence of computer events that can be recorded in an activity log for later analysis. Another activity log example is that of a database manager which fields search query requests concerning a database from multiple users and returns data fitting the query requests. The requests and responses comprise a sequence of events. A further example is that of a commercial order-filling or banking system that creates an activity log as it receives orders or account changes and operates on them in a transactional fashion.

In each of these examples, a log is kept because it might be necessary to trace the sequence of events performed by the computer system. As mentioned, this is useful in recovering from a system malfunction or equipment failure. These logs, however, are not typically recorded in an easily readable manner. Much of the information is coded and relatively cryptic. That is, processing errors are not readily apparent from viewing the log and significant events can be easily missed. For example, in many computer systems, a system error log stores a record of all of the error reports that are received from system components. The error log is used to trace and understand faults that have occurred. The number of errors in the log can be very large, however, and with the exception of a few patterns that the analyst may recognize from experience, the error log generally provides no clue as to the source of the error or how to solve it. In complex systems, the analyst may not even be able to determine whether the entries in the error log are due to a hardware fault or to a software problem.

These problems are exacerbated in computer or software systems that include multiple processors or software subsystems, each producing its own event flow or log. For example, in networked and distributed computing systems, capabilities of the system may be distributed among a plurality of modules, and the control, supervision, and administration capabilities of the system may be distributed among a plurality of computing facilities operating in cooperation. As in stand-alone systems, rapid recognition of the sources of new problems are critical to understanding the current state of the networked or distributed system so that prompt action can be taken to resolve such problems.

When a problem occurs, many possible logs or combinations of logs may be produced by the networked or distributed system. Analyzing the root cause of the problem requires identifying the "back-trace" or thread of events that lead up to or result from the problem. However, the event flows and logs can be enormous. Output of this volume, when produced on human-readable media, is difficult to use for problem identification. Accordingly, the logs from a computer are typically recorded electronically (e.g., stored in computer memory), rather than printed, and the logs from several computers are sometimes collected and recorded at a central location. Then, analysts needing to review the electronically stored logs typically use a log analysis tool which allows the user to search for and display logs of interest.

Although logs may be stored, searched, and displayed electronically, it nonetheless remains difficult for persons examining the output to understand the significance of a particular log event, or to identify or select those events which may be important from among the large quantity of data collected. Again, this is especially so in complex, networked, or distributed computing environments. Thus, with current methods, analysts must have extensive subject-matter expertise often including the application of anecdotal knowledge regarding problems previously encountered. Moreover, existing analysis tools are particularly ineffective at establishing and displaying meaningful correlations or patterns among log events occurring in a single computer, events occurring in a group of related computers, events occurring in computers directed to the same application, and events occurring across the installed base of computers in a networked or distributed system.

A need therefore exists for an improved event flow or log analysis tool. Accordingly, a solution that addresses, at least in part, the above and other shortcomings is desired.

SUMMARY

According to one aspect of the invention, there is provided a method for presenting event associations between events from one or more event flows on a display screen of a computer, including: constructing a sequence diagram representation, the representation having timelines for the event flows and directional paths between the timelines for the event associations; and, displaying the representation on the display.

Preferably, the method further includes the step of providing a graphical user interface for selecting a level of detail for the representation.

Preferably, the content for the selected level of detail is established by a predetermined relationship model for the event flows.

Preferably, the method further includes generating the event associations by selecting associated events from the event flows in accordance with one or more predetermined parameters.

Preferably, the predetermined parameters include time of occurrence.

Preferably, the event flows are logs.

Preferably, the sequence diagram is a universal modelling language ("UML") sequence diagram.

In accordance with further aspects of the present invention there is provided an apparatus such as data processing system, personal computer or server system, a method for adapting these systems, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EMBODIMENTS

The following detailed description of the embodiments of the present invention does not limit the implementation of the invention to any particular computer programming language. The present invention may be implemented in any computer programming language provided that the operating system ("OS") provides the facilities that may support the requirements of the present invention. A preferred embodiment is implemented in the JAVA™ computer programming language (or other computer programming languages such as C or C++). (JAVA and all JAVA-based trademarks are the trademarks of Sun Microsystems Corporation.) Any limitations presented would be a result of a particular type of operating system or computer programming language and would not be a limitation of the present invention.

Figure 1:
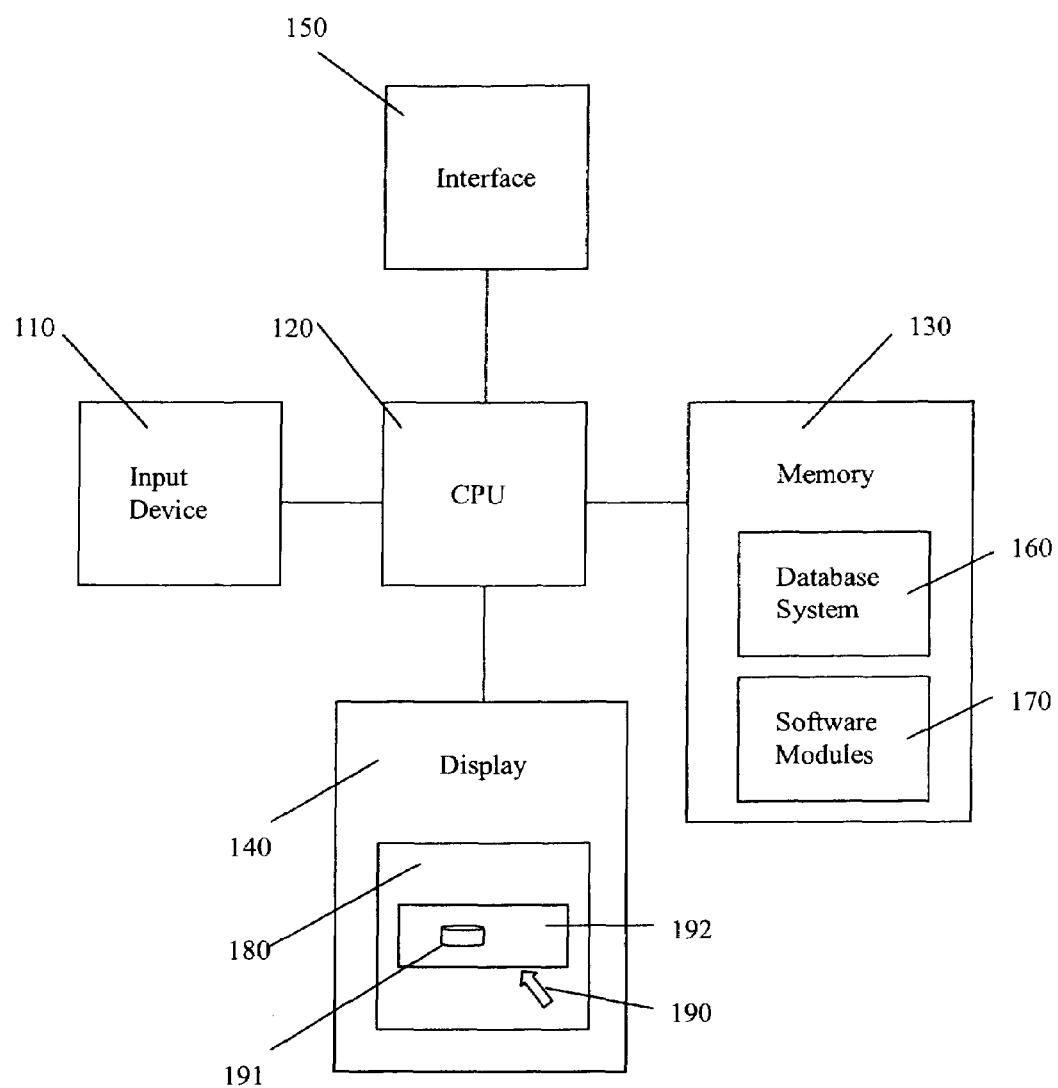
FIG. 1 is a block diagram illustrating an exemplary data processing system adapted for implementing an embodiment of the invention.

FIG. 1 is a block diagram illustrating an exemplary data processing system 100 adapted for implementing an embodiment of the invention. The data processing system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection. The data processing system 100 is adapted for presenting event associations between events from one or more event flows on the display screen 140.

The data processing system 100 may be a server system or a personal computer system. The CPU 120 of the data processing system 100 is operatively coupled to memory 130 which stores an operating system (not shown) for general management of the system 100. The interface 150 may be used for communicating to external data processing systems (not shown) through a network (not shown), such as the Internet. Examples of suitable data processing systems 100 include IBM® iSeries™ servers and ThinkPad® personal computers.

The data processing system 100 may include a database system for storing and accessing programming information. The database system 160 may include a database management system ("DBMS") and a database and is stored in the memory 130 of the data processing system 100. It will be appreciated that the database system 160 may be shipped or installed without the database to or by end users. In general, the DBMS is adapted to read a query generated by the data processing system 100 in response to a request for information submitted by a user typically through a user interface. The DBMS then executes the query against the database and provides a query result to the data processing system 100 for presentation to the user. It will be appreciated that the database system 160 may be stored in the memory 130 of the data processing system 100 or stored in a distributed data processing system (not shown).

An example of a suitable DBMS is the DB2® Universal Database™ Management System product available from IBM. The DBMS is a software layer interposed between the actual database (i.e. the data as stored for use by the CPU 120 of the system 100) and the users of the system. The DBMS is responsible for handling database transactions thus shielding users from the details of any specific computer hardware or database implementation. Using relational techniques, the DBMS stores, manipulates and retrieves data in the form of table-like relations typically defined by a set of columns or attributes of data types and a set of rows (i.e. records or tuples) of data. The standard database query language for dealing with relational databases implemented by most commercial DBMSs is the Structured Query Language ("SQL").

The data processing system 100 includes computer executable programmed instructions for directing the system 100 to implement the embodiments of the present invention. The programmed instructions may be embodied in one or more software modules 170 resident in the memory 130 of the data processing system 100. Alternatively, the programmed instructions may be embodied on a recordable-type computer readable medium (such as a CD disk or floppy disk) which may be used for transporting the programmed instructions to the memory 130 of the data processing system 100. Alternatively, the programmed instructions may be embedded in a computer-readable, signal-bearing medium that is uploaded to a network by a vendor or supplier of the programmed instructions and this medium may be downloaded through the interface 150 to the data processing system 100 from the network by end users or potential buyers.

The CPU 120 of the system 100 is typically coupled to one or more devices 110 for receiving user commands or queries and for displaying the results of these commands or queries to the user on a display 140. For example, user queries may be transformed into a combination of SQL commands for producing one or more tables of output data which may be incorporated in one or more display pages for presentation to the user. The CPU 120 is coupled to memory 130 for containing software modules 170 and data such as base tables or virtual tables such as views or derived tables. As mentioned, the memory 130 may include a variety of storage devices including internal memory and external mass storage typically arranged in a hierarchy of storage as understood to those skilled in the art.

A user may interact with the data processing system 100 and its software modules 170 using a graphical user interface ("GUI") 180. GUIs are supported by common operating systems, such as IBM OS/2®, and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Now, according to one embodiment of present invention, sequence diagrams presented on the display 140 of a data processing system 100 are used to show interactions across the entire scope of complex software and computer systems, from methods to objects, to classes, to threads, to process, to machine, to machine cluster interactions. In real-time environments, sequence diagrams are useful for visualizing execution histories or traces. This is very helpful in understanding at a higher level how an application or network of applications have interacted as opposed to how they are designed to possibly interact. As applications become increasingly distributed, and increasingly composed from other applications, an understanding of the actual component interactions is important for understanding process behaviour. Such sequence diagrams may be defined and rendered using UML.

In today's software industry, standards are emerging for the visualization of various concepts. One such standard is UML. UML may be used for specifying, visualizing, constructing, and documenting the components of a software system and is broadly accepted for the visualization of software structure and implementation behaviour. UML encompasses a wide-range of visual models that are useful in documenting system requirements and for system design, including: class diagrams, collaboration diagrams, sequence diagrams, state charts, activity diagrams, component diagrams, deployment diagrams, and package diagrams. Thus, for example, in UML there are specific ways to render a class definition and how it relates to other classes. Moreover, as will be described below, sequence diagram presentations may be used to visualize instance interactions over time.

Figure 2:
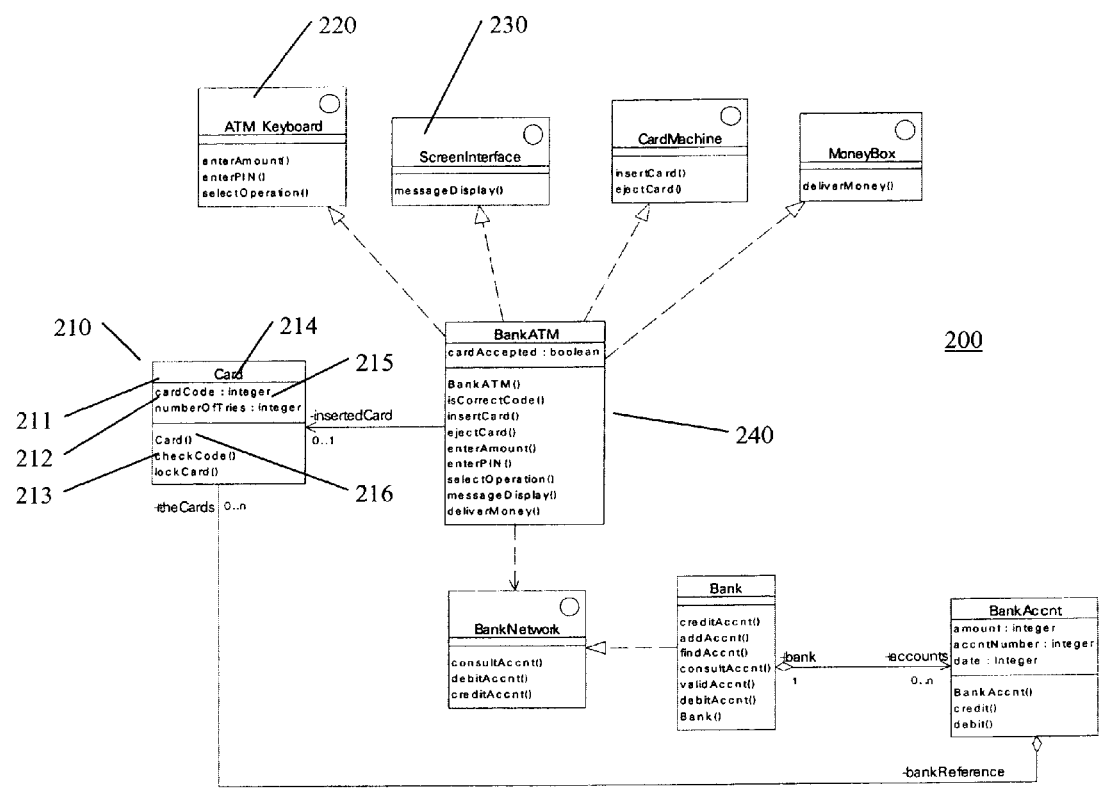
FIG. 2 is a partial screen capture illustrating a class diagram for a process in accordance with an embodiment of the invention.

FIG. 2 is a partial screen capture illustrating a class diagram 200 for a process in accordance with an embodiment of the invention. In FIG. 2, the process is an automated teller machine ("ATM") process. The class diagram 200 may be presented to a user on the display screen 140 of a data processing system 100 through a GUI 180. In object oriented programming, a "class" is a collection of "objects" with common structure, behaviour, relationships, and semantics. A class, for example the Card 210 class or object, is represented in the UML class diagram 200 as a rectangle 210 with three compartments 211, 212, 213. The first compartment 211 shows the class name 214, the second compartment 212 shows the class attribute(s) 215 (i.e. structure), and the third compartment 213 shows the class operation(s) 216 (i.e. behaviour). The class diagram 200 provides a view of the static nature of the ATM process.

Figure 3:
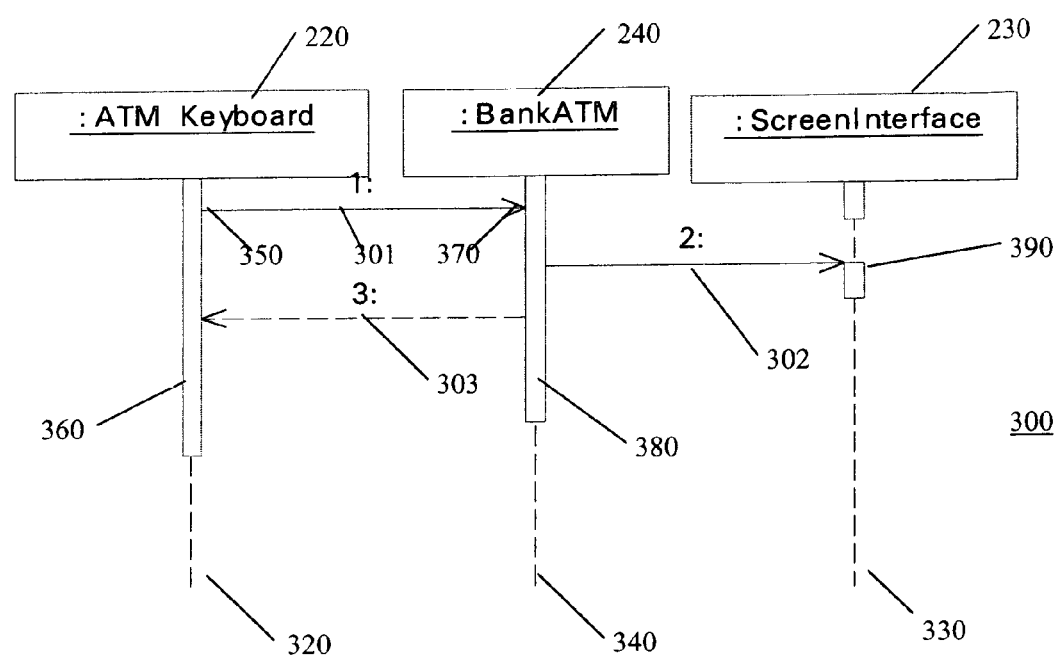
FIG. 3 is a partial screen capture illustrating a sequence diagram relating to the class diagram of FIG. 2 in accordance with an embodiment of the invention.

FIG. 3 is a partial screen capture illustrating a sequence diagram 300 relating to the class diagram 200 of FIG. 2 in accordance with an embodiment of the invention. The sequence diagram 300 may be presented to a user on the display screen 140 of a data processing system 100 through a GUI 180 having various windows 192. The sequence diagram 300 shows object interactions arranged in a time sequence. In FIG. 3, the sequence chart 300 includes the ATM_Keyboard 220, BankATM 240, and ScreenInterface 230 classes or objects shown in FIG. 2. These objects may be concurrently operating. Each object 220, 230, 240 and event flow therefrom 320, 330, 340 is represented in the diagram 300 by a rectangle 220, 230, 240 and a vertical timeline 320, 330, 340, respectively. In general, the objects 220, 230, 240 shown in the sequence diagram 300 coordinate their operations by means of messages 1, 2, 3. Each message may be represented by a respective arrow 301, 302, 303. For example, arrow 301 may represent a keyboard stroke message that is sent from the ATM_Keyboard 220 object to the BankATM 240 object. Source and destination are indicated in FIG. 3 by the tail and head of each arrow 301, 302, 303.

When a message is sent, a send event occurs, and when it is received, a receive event occurs. A send event is indicated in the sequence diagram 300 by the point 350 at which the arrow 301 representing a message leaves the sending method 360 and a receive event is indicated by the point 370 at which the arrow representing the message enters the receiving method 380. Logical and temporal relationships between events can be expressed by means of event associations or pairs. For example, event 350 is the causal predecessor of event 370, and that relationship can be expressed by an event association or pair 350, 370. Thus, each event association 350, 370 may also be represented by an arrow 301. The event association may include, for example, program call and return messages.

The flow of events 320, 330, 340 may be recorded in log files for each object 220, 230, 240 and stored in the memory 130 or database 160 of the data processing system 100. Modules 170 within the data processing system 100 interpret the logs and their stored events to generate event associations or pairs 350, 370 which may in turn be represented by an arrow 301 in a sequence diagram 300. The event associations or pairs 350, 370 may also be stored in memory 130.

Logs may be filtered or parsed by modules 170 within the data processing system 100 to facilitate event association. For example, events 350, 370 appearing in separate object logs 320, 340 may be time-stamped to facilitate their association. As another example, call and return message events may be linked to produce an event association. As a further example, an explicit correlator such a uniform resource identifier ("URI") or Web page address string may be used to associate events in multiple logs. Optionally, non-associated events may be suppressed or excluded by filtering. The present invention may be applied not only to logs but to any event flow or trace data.

Having generated a number of event associations 350, 370, modules 170 within the data processing system then use or call a rendering engine, such as UML-based design tool Rational Rose®, to generate a sequence diagram 300. Referring to FIG. 3, the UML-based rendering engine places a class 220, 230, 240 or object or component at the top of the sequence diagram 300. Below each class rectangle 220, 230, 240 is placed a vertical timeline 320, 330, 340 representing each corresponding event flow 320, 330, 340. Then, each method interaction 350, 370 that is a child of that top node is drawn as an arrow 301 between appropriate timelines 320, 340 to associate two appropriate events between one or two top nodes 220, 240. In this way, UML sequence diagram rendering may be used to analyze logs by presenting log events graphically. While any rendering engine that is capable of interaction graphing may be used, a UML-based rendering engine is preferred. The rendering engine need not know that it is presenting event associations from multiple logs for analysis. In fact, event flows or logs are a domain over which UML has not been used.

Of course one potential limitation of using sequence diagrams to analyse event flows is related to the scalability of these diagrams. Any significant design or trace will produce a very large amount of data to be rendered. However, according to the present invention, each top node can be a thread, process, machine, or cluster.

In addition, the present invention does not restrict UML to a specific set of software components (e.g., objects). For example, UML views such as class and sequence diagrams do not show thread, process or machine boundaries and hence this information has to be assumed or asserted at the component level.

Furthermore, continuity can be leveraged by "drilling down" from the most abstract top node down to the actual method involved. In a GUI 180, this can be achieved by supporting the common operation of double clicking on the object of interest 191, as described above.

For example, a simple sequence diagram can show the interaction between a number of machines. Since the vertical axis of the sequence diagram corresponds to time, a user can decide if they want to drill down on a particular interaction between two machines, for example, because it appears to be suspiciously slow. The user can double click on the node representing the machine in question and would be presented with a sequence diagram illustrating the process interactions involved that are within the selected machine. Next, the user can drill down again into a process within the machine and so on down to a particular method invocation. By using a single metaphor (i.e. a double-click operation) and notation (i.e. sequence diagrams) it is less likely that the user is distracted from the task at hand, which is to understand the machine's behaviour.

Figure 4:
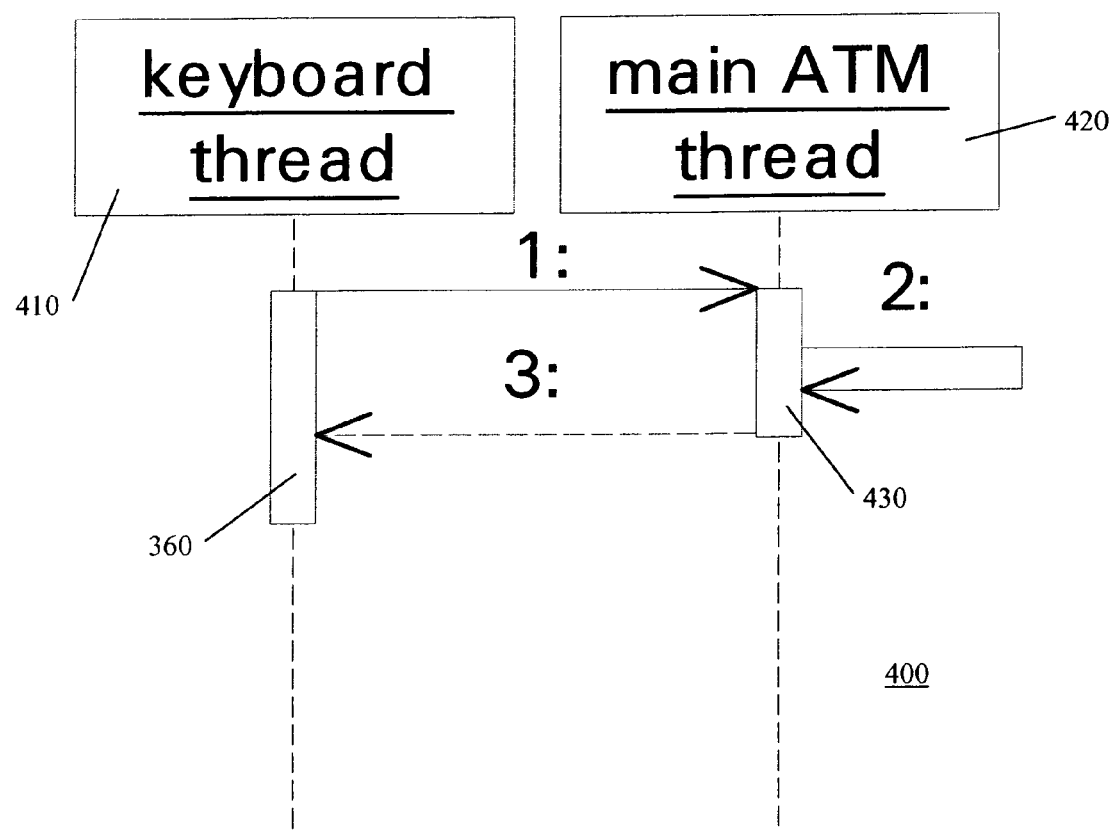
FIG. 4 is a partial screen capture illustrating a higher level sequence diagram relating to the sequence diagram of FIG. 3 in accordance with an embodiment of the invention.

FIG. 4 is a partial screen capture illustrating a higher level sequence diagram 400 relating to the sequence diagram 300 of FIG. 3 in accordance with an embodiment of the invention. Again, the sequence diagram 400 may be presented to a user on the display screen 140 of a data processing system 100 through a GUI 180. In FIG. 4, the keyboard thread 410 includes the ATM_Keyboard object 230 of FIG. 3 and the main ATM thread 420 includes both the BankATM 240 and ScreenInterface 230 objects of FIG. 3. From FIG. 4, a user could drill down to a presentation such as FIG. 3 by clicking on the rectangle representing the main ATM thread 420. Thus, the ATM_Keyboard 220 and ScreenInterface 230 are on different threads, that is, the keyboard 410 and main ATM 420 threads, respectively. However, messages 1, 2, 3 between the objects 220, 230, 240 shown in FIG. 3 may still be represented in the higher level view of FIG. 4. In FIG. 4, message 2 is shown as leaving and entering a single method 430 which may be considered as including methods 380 and 390 of FIG. 3. Thus, while the level of detail of FIG. 4 may be less than that of FIG. 3, much of the information pertaining to messages (e.g., their time of occurrence) is retained. Optionally, message 2 could be hidden in FIG. 4.

Figure 5:
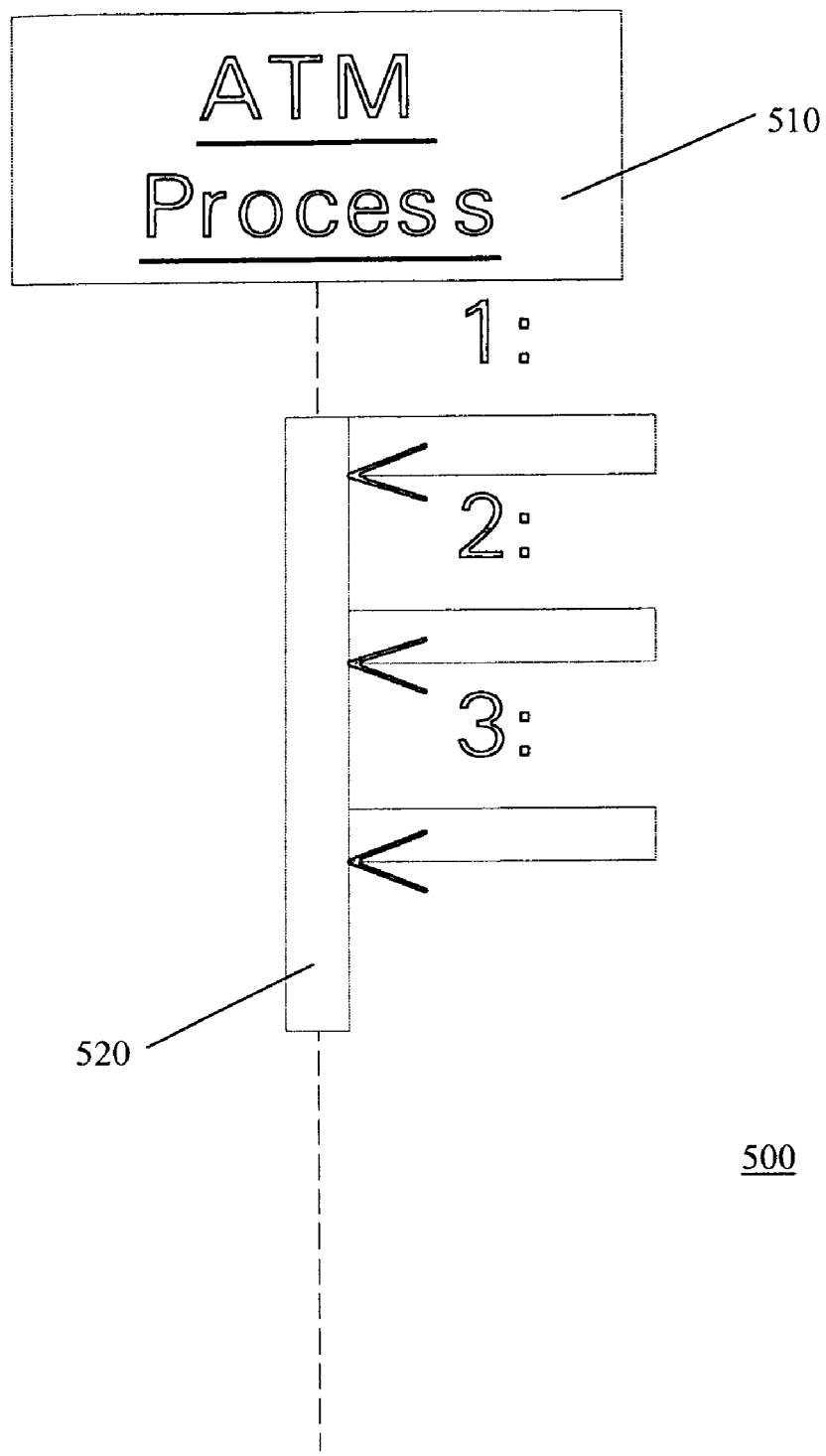
FIG. 5 is a partial screen capture illustrating a higher level sequence diagram relating to the sequence diagram of FIG. 4 in accordance with an embodiment of the invention.

FIG. 5 is a partial screen capture illustrating a higher level sequence diagram 500 relating to the sequence diagram 400 of FIG. 4 in accordance with an embodiment of the invention. Again, the sequence diagram 500 may be presented to a user on the display screen 140 of a data processing system 100 through a GUI 180. In FIG. 5, the ATM Process 510 includes both the keyboard 410 and main ATM 420 threads of FIG. 4. From FIG. 5, a user could drill down to a presentation such as FIG. 4 by clicking on the rectangle representing the ATM Process 510. Again, messages 1, 2, 3 between the threads 410, 420 shown in FIG. 4 may still be represented in the higher level view of FIG. 5. In FIG. 5, messages 1, 2, 3 are shown as leaving and entering a single method 520 which may be considered as including methods 360 and 430 of FIG. 4. Again, while the level of detail of FIG. 5 may be less than that of FIG. 4, much of the information pertaining to messages (e.g., their time of occurrence) is retained. Optionally, messages 1, 2, or 3 could be hidden in FIG. 5.

Figure 6:
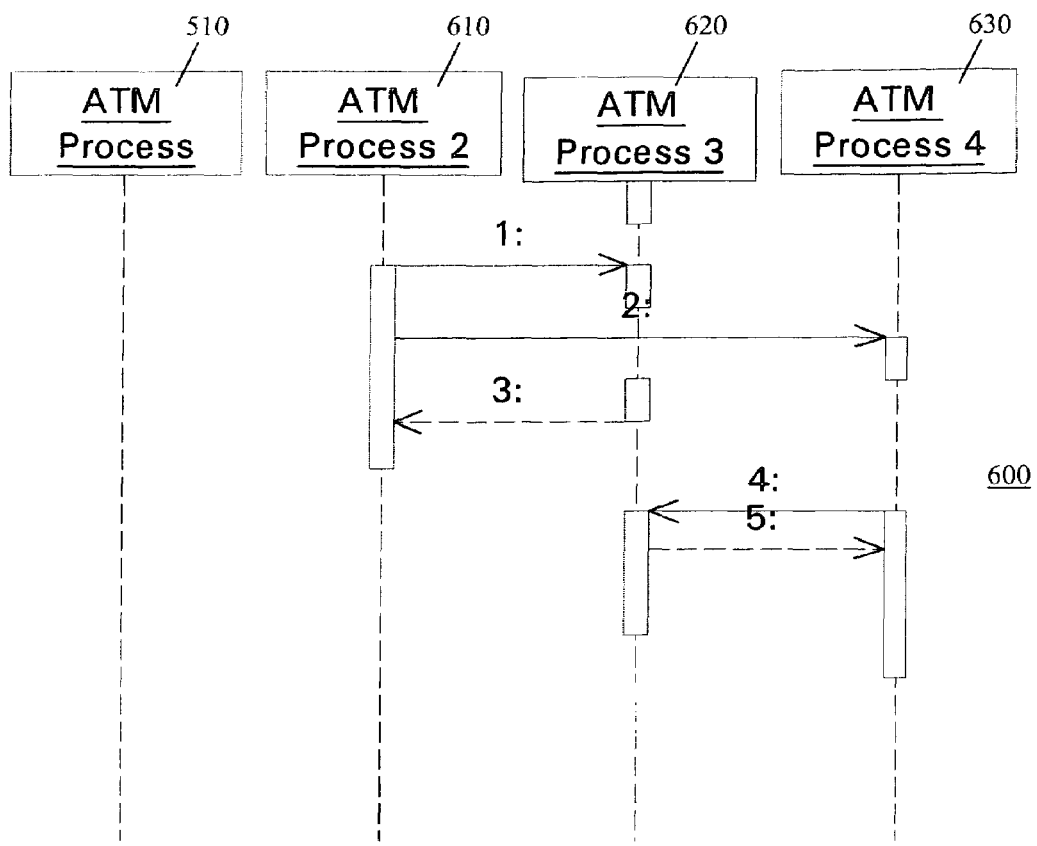
FIG. 6 is a partial screen capture illustrating a higher level sequence diagram relating to the sequence diagram of FIG. 5 in accordance with an embodiment of the invention.

FIG. 6 is a partial screen capture illustrating a higher level sequence diagram 600 relating to the sequence diagram 500 of FIG. 5 in accordance with an embodiment of the invention. Again, the sequence diagram 600 may be presented to a user on the display screen 140 of a data processing system 100 through a GUI 180. In FIG. 6, the ATM Process 510 of FIG. 5 is shown within a machine or machine cluster of ATM Processes 510, 610, 620, 630. From FIG. 6, a user could drill down to a presentation such as FIG. 5 by clicking on the rectangle representing the ATM Process 510. Note that FIG. 6 includes representative messages 4, 5 between ATM Processes 620, 630.

By allowing a user to drill down from higher level sequence diagrams to lower level sequence diagrams, it is less likely that the user is distracted by levels of messaging details that are not relevant to the problem that is being analyzed.

Figure 7:
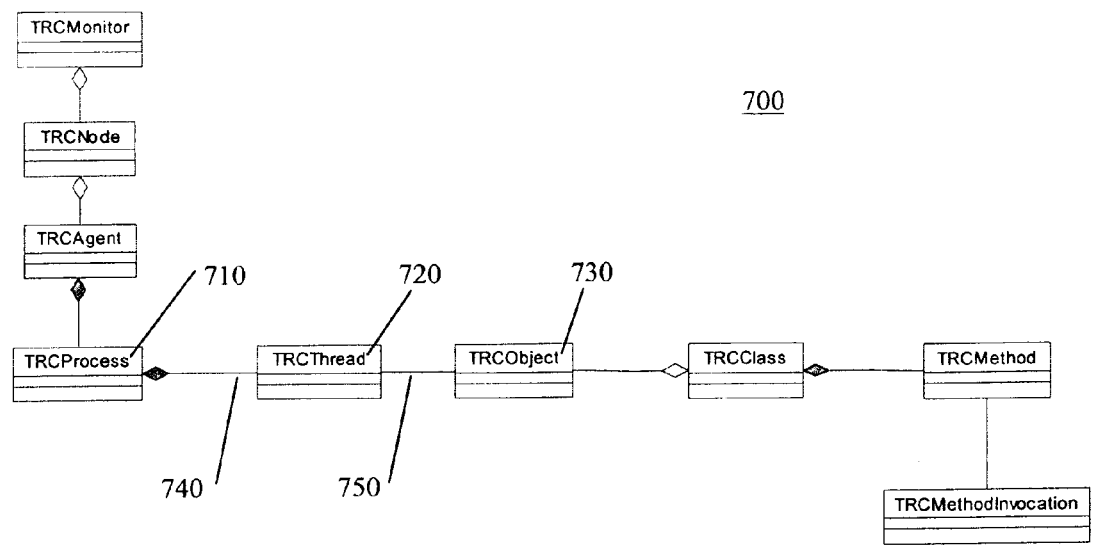
FIG. 7 is a block diagram illustrating a data model for sequence diagrams in accordance with an embodiment of the invention; and, FIG. 8 is a flow chart illustrating operations of modules within a data processing system for presenting event associations between events from one or more event flows on a display screen of a computer in accordance with an embodiment of the invention.

FIG. 7 is a block diagram illustrating a data model 700 for sequence diagrams in accordance with an embodiment of the invention. The data model 700 provides a set of nodes 710, 720, 730 and connections 740, 750 for linking lower level software entities or machines to higher level software entities or machines and hence enabling a user to drill down from higher to lower level sequence diagrams as described above. In FIG. 7, a process node 710 representing a process is linked by connection 740 to a thread node 720 representing a thread which in turn is linked by connection 750 to an object node 710 representing an object. This model specifies, for example, that a user may drill down from a process level sequence diagram 500 such as that shown in FIG. 5 to a thread level sequence diagram 400 such as that shown in FIG. 4 and then to an class or object level sequence diagram 300 such as that shown in FIG. 3.

The data model 700 is stored in the memory 130 of the data processing system 100 and may be viewed or edited by a user through the system's GUI 180. Modules 170 within the data processing system 100 interpret the data model 700 to produce sequence diagrams 300, 400, 500, 600 for display to a user.

Figure 8:
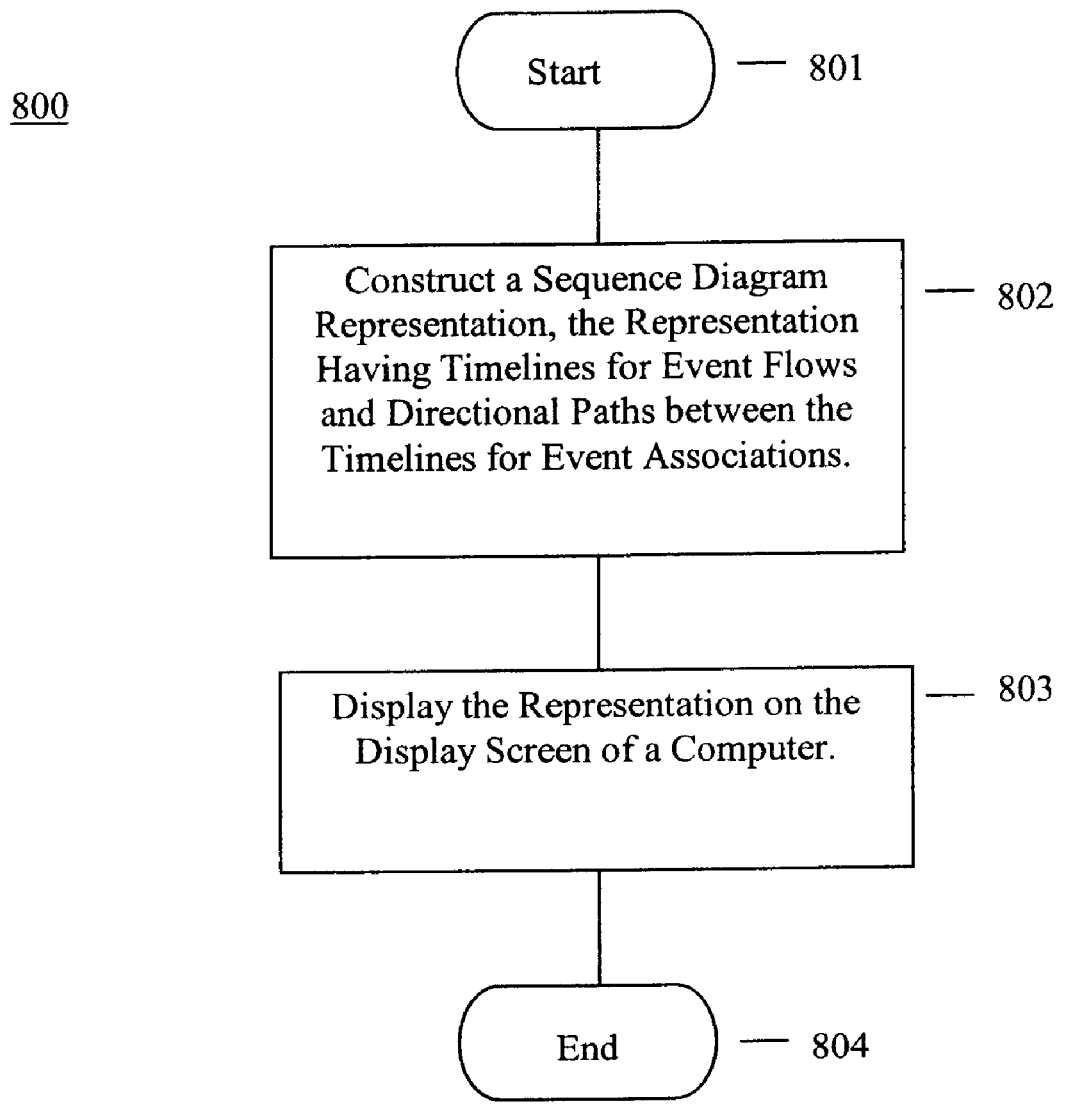

FIG. 8 is a flow chart illustrating operations 800 of modules 170 within a data processing system 100 for presenting event associations 301 between events 350, 370 from one or more event flows 320, 340 on a display screen 140 in accordance with an embodiment of the invention.

At step 801, the operations 800 start.

At step 802, a sequence diagram representation 300 is constructed, the representation having timelines 320, 330, 340 for the event flows and directional paths 301, 302, 303 between the timelines 320, 330, 340 for the event associations. Preferably, the operations 800 further include the step of generating the event associations by selecting associated events 350, 370 from the event flows in accordance with one or more predetermined parameters. Preferably, the predetermined parameters include time of occurrence. Preferably, the event flows are logs. Preferably, the sequence diagram is a UML sequence diagram.

At step 803, the representation 300 is displayed on the display 140. Preferably, the operations 800 further include the step of providing a graphical user interface 180 for selecting a level of detail 400, 500, 600 for the representation 300. Preferably, the content for the selected level of detail 400, 500, 600 is established by a predetermined relationship model 700.

At step 804, the operations 800 end.

While this invention is primarily discussed as a method, a person of ordinary skill in the art understands that the apparatus discussed above with reference to a data processing system may be programmed to enable the practice of the method of the invention. Moreover, an article of manufacture for use with a data processing system, such as a pre-recorded storage device or other similar computer readable medium including program instructions recorded thereon may direct the data processing system to facilitate the practice of the method of the invention. It is understood that such apparatus and articles of manufacture also come within the scope of the invention.

The embodiment(s) of the invention described above is(are) intended to be exemplary only. The scope of the invention is therefore intended to be limited solely by the scope of the appended claims.

We claim:

1. A method for presenting event associations between events from one or more event flows on a display screen of a computer, comprising:

parsing at least one log file to generate the event associations and to suppress non-associated events, wherein the at least one log file comprises the events from the one or more event flows;

generating said event associations by selecting associated events from said one or more event flows in accordance with one or more predetermined parameters, wherein the predetermined parameters include time of occurrence;

constructing multiple sequence diagram representations at lower levels in a first sequence diagram representation, wherein a user drills down from the first sequence diagram representation to the lower levels, and wherein the first sequence diagram representation and the multiple sequence diagram representations show interactions arranged in a time sequence for methods, objects, classes, threads, and processes, and wherein said first sequence diagram representation comprises timelines for said one or more event flows and directional paths between said timelines for said event associations, and wherein the multiple sequence diagram representations comprise a level of detail between objects located on threads in the first sequence diagram representation that are collapsible, wherein the event associations are selected according to the predetermined parameters; and displaying said first sequence diagram representation on said display screen.

2. The method of claim 1 further comprising providing a graphical user interface for selecting the level of detail for said first sequence diagram representation and the multiple sequence diagram representations and wherein the first sequence diagram representation and the multiple sequence diagram representations show thread, process, and machine boundaries.

3. The method of claim 2, wherein content for said level of detail is established by a predetermined relationship model for said one or more event flows.

4. The method of claim 1 wherein the event associations are presented from multiple logs.

5. The method of claim 1, parsing the at least one log file to generate the event associations and to suppress non-associated events further comprises;

linking call and return message events to produce the event associations.

6. The method of claim 1, wherein said sequence diagram is a universal modeling language ("UML") sequence diagram.

7. A method for presenting event associations between events from one or more event flows on a display screen of a computer, comprising:

parsing at least one log file to generate the event associations and to suppress non-associated events, wherein the at least one log file comprises the events from the one or more event flows;

generating said event associations by selecting associated events from said one or more event flows in accordance with one or more predetermined parameters, wherein the predetermined parameters include time of occurrence;

constructing multiple sequence diagram representations using Unified Modeling Language (UML) at lower levels in a first sequence diagram representation, wherein a user drills down from the first sequence diagram representation to the lower levels, wherein the first sequence diagram representation and the multiple sequence diagram representations show interactions arranged in a time sequence for methods, objects, classes, threads, and processes and wherein said first sequence diagram representation comprises timelines for said one or more event flows and directional paths between said timelines for said event associations, and wherein the multiple sequence diagram representations comprise a level of detail between objects located on threads in the first sequence diagram representation that are collapsible, wherein the event associations are selected according to the predetermined parameters, and wherein content for said level of detail is established by a predetermined relationship model for said one or more event flows; and displaying said first sequence diagram representation on said display screen.

* * * * *